(12) United States Patent
Cheng et al.

(10) Patent No.: US 7,950,825 B2
(45) Date of Patent: *May 31, 2011

(54) OPTICAL LENS AND ILLUMINATING DEVICE INCORPORATING THE SAME

(75) Inventors: Yi-Kai Cheng, Miao-Li Hsien (TW);
Jyh-Long Chern, Miao-Li Hsien (TW);
Ping-Yu Chen, Miao-Li Hsien (TW)

(73) Assignee: Foxsemicon Integrated Technology, Inc., Chu-Nan, Maio-Li Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,816

(22) Filed: Jun. 8, 2010

(65) Prior Publication Data

US 2010/0238668 A1    Sep. 23, 2010

Related U.S. Application Data

(62) Division of application No. 12/168,776, filed on Jul. 7, 2008.

(51) Int. Cl.
*F21V 1/00* (2006.01)
(52) U.S. Cl. ........ 362/237; 362/326; 362/331; 362/333; 362/335; 362/336; 362/311.02

(58) Field of Classification Search .................. 362/606, 362/612, 613, 619, 620, 509, 257, 308, 309, 362/311.01, 311.02, 236, 238, 237, 333, 362/335, 331, 326
See application file for complete search history.

(56) References Cited

U.S. PATENT DOCUMENTS

| | | | | |
|---|---|---|---|---|
| 2,120,263 A | * | 6/1938 | Ross | 369/112.26 |
| 5,580,156 A | * | 12/1996 | Suzuki et al. | 362/184 |
| 6,070,993 A | * | 6/2000 | Natsume | 362/309 |
| 6,244,727 B1 | * | 6/2001 | Ryan et al. | 362/244 |
| 6,250,777 B1 | * | 6/2001 | Aoyama | 362/326 |
| 7,794,117 B2 | * | 9/2010 | Cheng et al. | 362/335 |
| 2008/0055932 A1 | * | 3/2008 | Chao et al. | 362/615 |

* cited by examiner

*Primary Examiner* — John A Ward
(74) *Attorney, Agent, or Firm* — Raymond J. Chew

(57) ABSTRACT

An optical lens includes an array of lens units. Each lens unit includes a main body, a light diverging portion and a light converging portion. The main body includes a light incident surface and a light emitting surface opposite to the light incident surface. The light diverging portion is configured for expanding a light field along a first direction, and the light converging portion is configured for compressing a light field along a second direction. The light diverging portion and the light converging portion are both formed on one of the light incident surface and the light emitting surface.

15 Claims, 14 Drawing Sheets

OPTICAL LENS AND ILLUMINATING DEVICE INCORPORATING THE SAME

CROSS-REFERENCE TO RELATED APPLICATION

This patent application is a divisional application of patent application Ser. No. 12/168,776, filed on Jul. 7, 2008, entitled "OPTICAL LENS AND ILLUMINATING DEVICE INCORPORATING THE SAME", assigned to the same assignee, and disclosure of which is incorporated herein by reference in its entirety.

BACKGROUND

1. Technical Field

The disclosure generally relates to illuminating devices, and particularly to an illuminating device incorporating an optical lens, which can improve utilization rate of light emitted from light emitting diodes (LEDs).

2. Description of Related Art

With the continuing development of scientific technology, LEDs have been widely used in illumination devices to substitute for conventional cold cathode fluorescent lamps (CCFL) due to their high brightness, long life-span, and wide color gamut. Relevant subject matter is disclosed in an article entitled "Solid State Lighting: Toward Superior Illumination", published in a magazine Proceedings of the IEEE, Vol. 93, No. 10, by Michael S. Shur et al. in October, 2005, the disclosure of which is incorporated herein by reference.

Conventional illuminating devices incorporating LEDs generally generate butterfly-type light fields or diffusion-type light fields. Referring to FIG. 14, a diffusion-type light field is shown. The diffusion-type light field is substantially circular. In other words, a part of the light field along an x-direction is substantially the same as a part of the light field along a y-direction. However, this type of light field is not always required in our daily life, such as in a street lamp, which has a strip-type light field requirement. If the diffusion-type light field is applied in the street lamp, part of light will be lost, which decreases utilization rate of the light emitted from the LEDs.

What is needed, therefore, is an optical lens and an illuminating device incorporating the optical lens, which can improve utilization rate of the light emitted from LEDs.

BRIEF DESCRIPTION OF THE DRAWINGS

Many aspects of the present illuminating device can be better understood with reference to the following drawings. The components in the drawings are not necessarily drawn to scale, the emphasis instead being placed upon clearly illustrating the principles of the present illuminating device. Moreover, in the drawings, like reference numerals designate corresponding parts throughout the several views.

DETAILED DESCRIPTION

Figure 1:
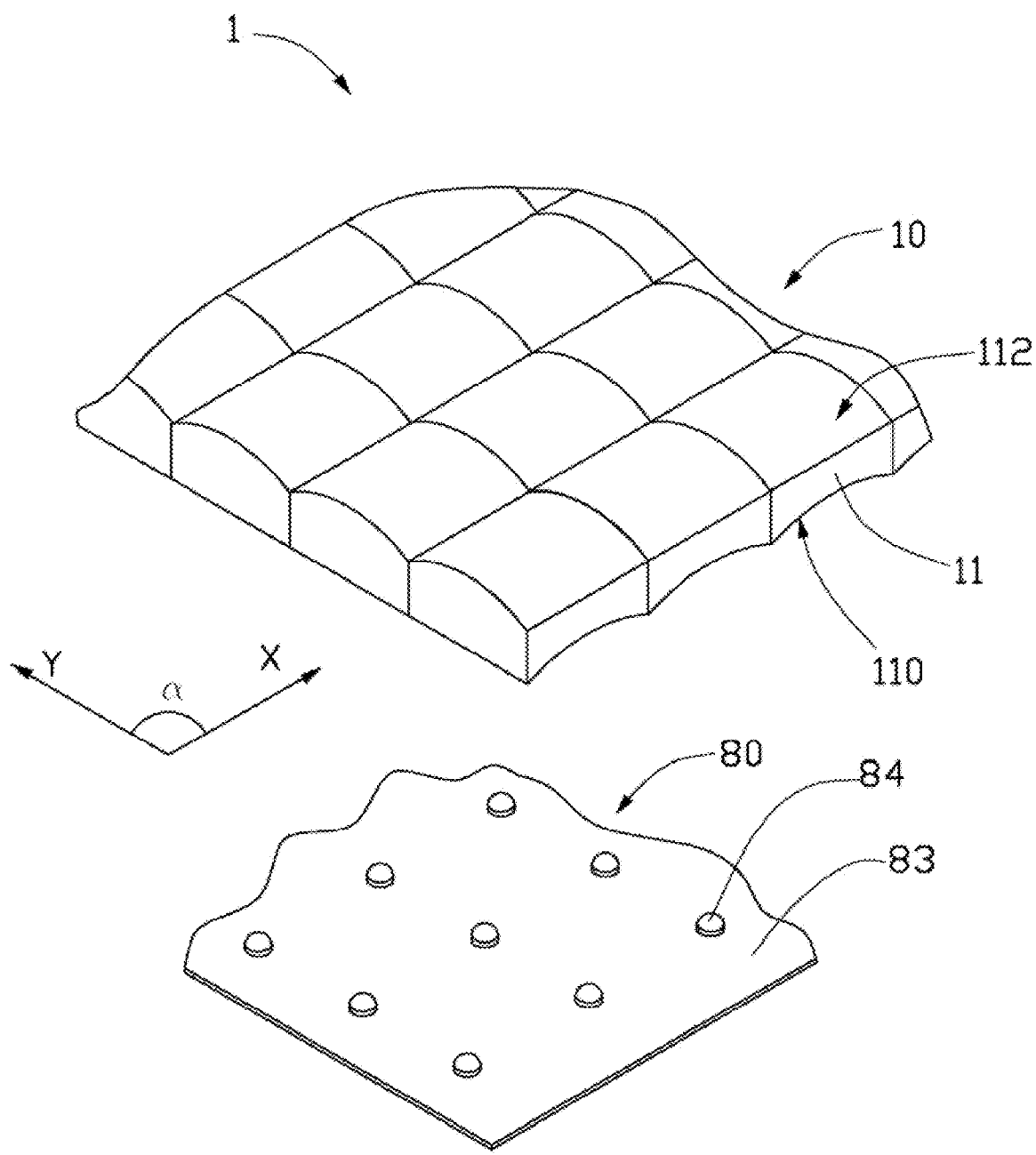
FIG. 1 is an isometric, schematic view of an illuminating device, in accordance with a first embodiment of the disclosure.

Referring to FIG. 1, an illuminating device 1 in accordance with a first embodiment of the disclosure includes an optical lens 10 and a light source module 80 emitting light towards the optical lens 10.

The optical lens 10 is used to adjust the light so that the light can generate a light field in a desired shape. The optical lens 10 includes an array of lens units 11. The light source module 80 includes a circuit board 83 and a plurality of light emitting diodes (LEDs) 84 mounted on the circuit board 83. The LEDs 84 have one-to-one corresponding relationships with respect to the lens units 11 of the optical lens 10.

Figure 2:
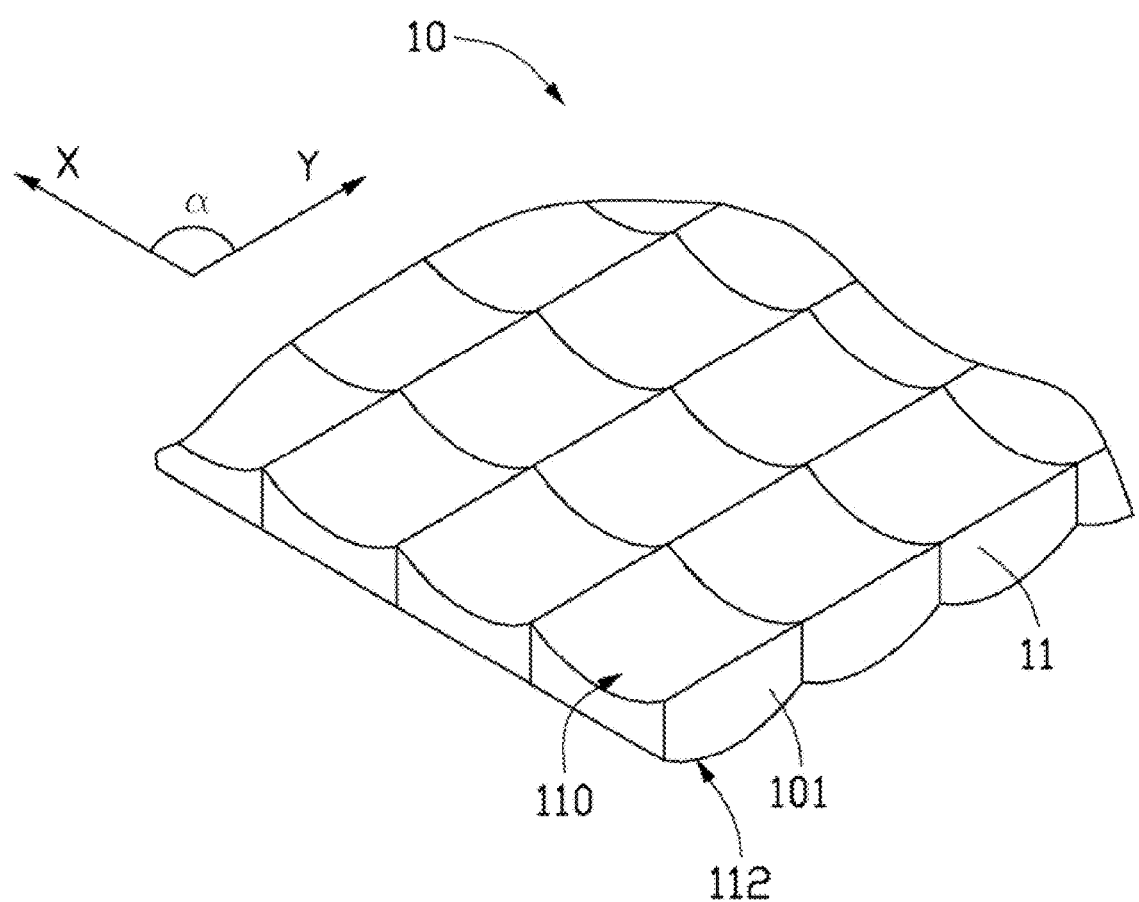
FIG. 2 is an isometric view of an optical lens of the illuminating device of FIG. 1, but viewed from another aspect.

Referring to FIG. 2, the optical lens 10 is viewed from another aspect. Each lens unit 11 includes a main body 101. The main body 101 has a light incident surface 110 and a light emitting surface 112 opposite to the light incident surface 110. The light emitted from the LEDs 84 enters into the lens units 11 from the light incident surface 110, and exits out of the lens units 11 from the light emitting surface 112.

Figure 3:
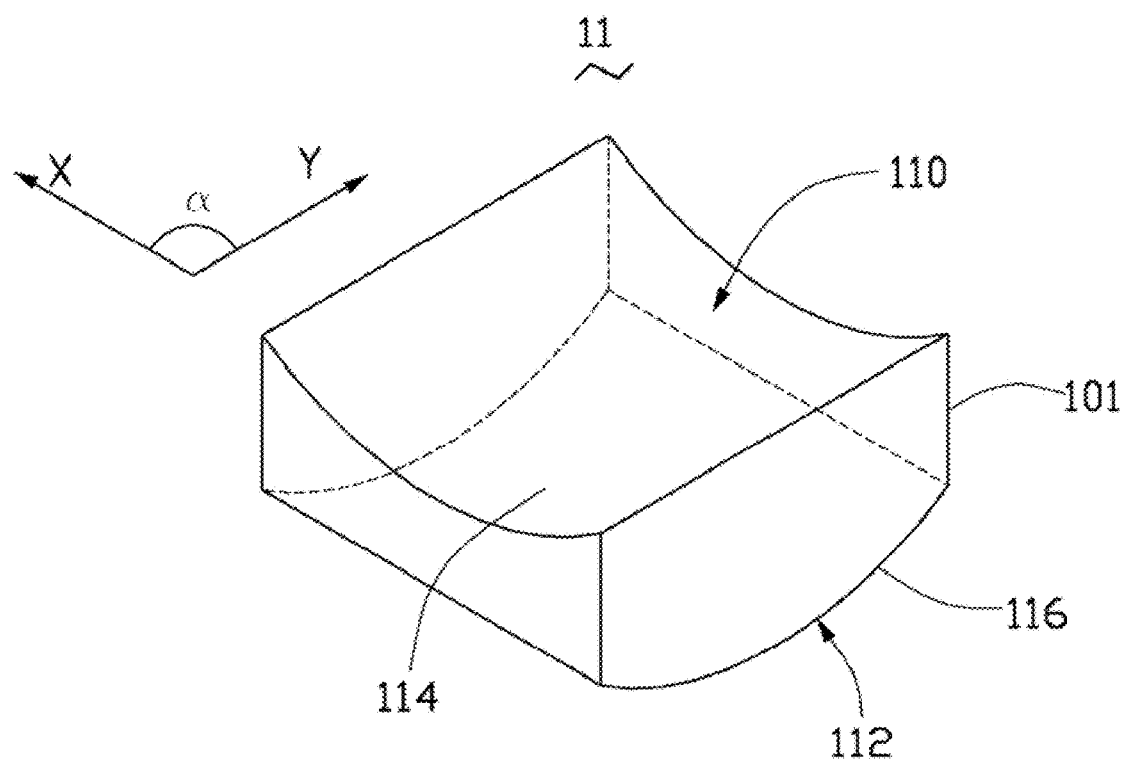
FIG. 3 is an isometric view of a lens unit of the optical lens of FIG. 2.

Referring to FIG. 3, each lens unit 11 further includes a light diverging portion 114 for diverging the light emitted from the LEDs 84 along an x-direction, and a light converging portion 116 for converging the light emitted from the LEDs 84 along a y-direction. An angle α defined between the x-direction and the y-direction is 90 degrees.

In the present embodiment, the light diverging portion 114 is formed on the light incident surface 110. The light incident surface 110 is a concave curved surface. In the present embodiment, the concave curved surface is a portion of an inner side surface of a cylinder. The light incident surface 110 extends along the y-direction and serves as the light diverging portion 114. Due to the configuration of the light diverging portion 114, the light diverging portion 114 enables the light passing therethrough to radially deflect from the x-direction. In other words, the light is deflected from a center towards two sides of the light incident surface 110. As a result, a part of the light field along the x-direction generated by the LEDs 84 is expanded after the light passes through the light diverging portion 114.

The light converging portion 116 is formed on the light emitting surface 112. The light emitting surface 112 has a convex curved surface. In the embodiment, the convex curved surface is a portion of an outer side surface of a cylinder. The light emitting surface 112 extends along the x-direction and serves as the light converging portion 116. Due to the configuration of the light converging portion 116, the light converging portion 116 enables the light passing therethrough to deflect from two sides towards a center of the light emitting surface 112. As a result, a part of the light field along the y-direction generated by the LEDs 84 is compressed after the light passes through the light converging portion 116.

Figure 4:
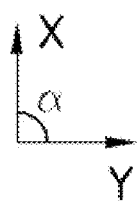
FIG. 4 is a graphic view showing a light field generated by the illuminating device of FIG. 1.
Figure 4:
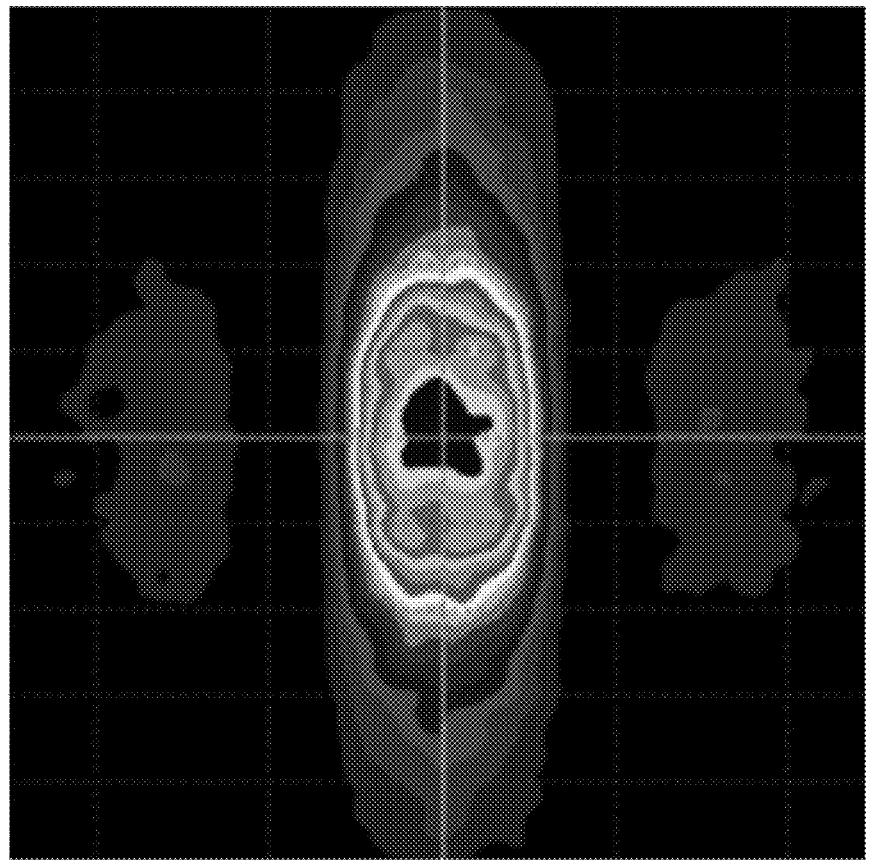
Figure 5:
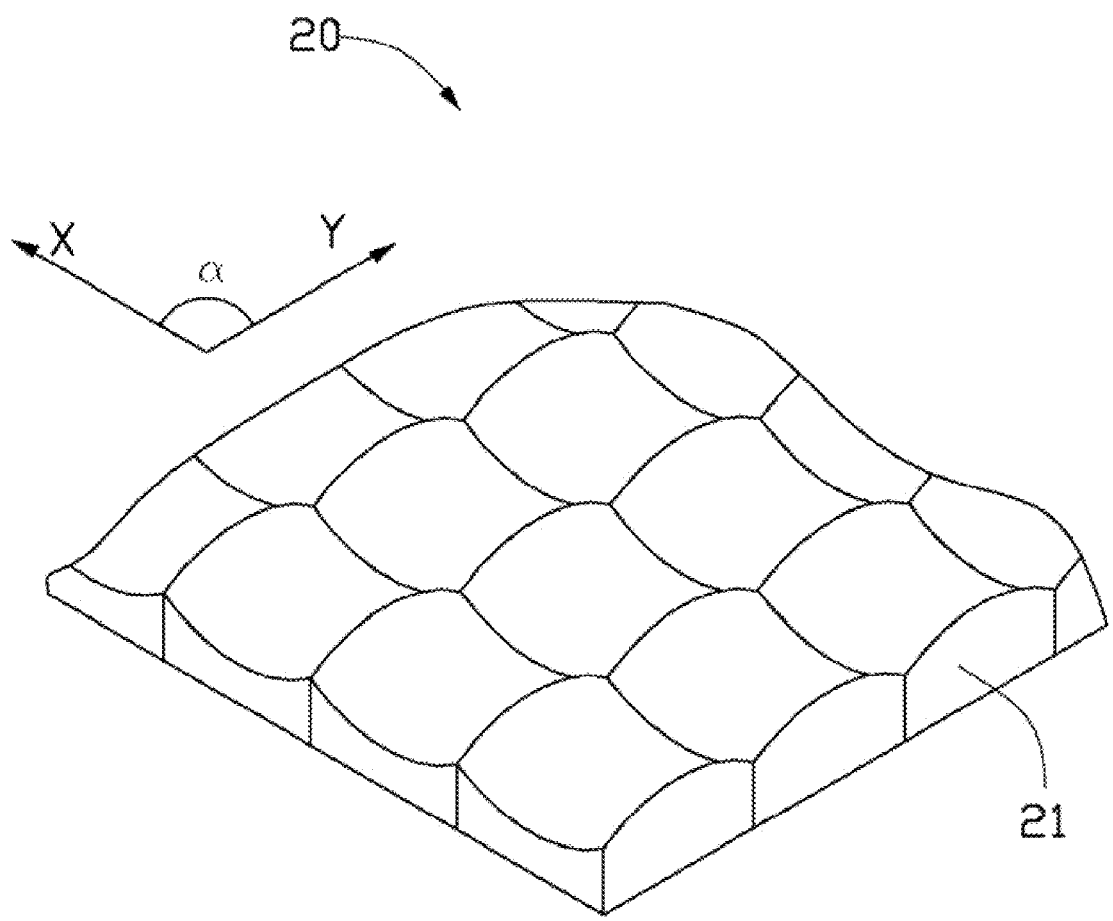
FIG. 5 is an isometric, schematic view of an optical lens, in accordance with a second embodiment of the disclosure.
Figure 6:
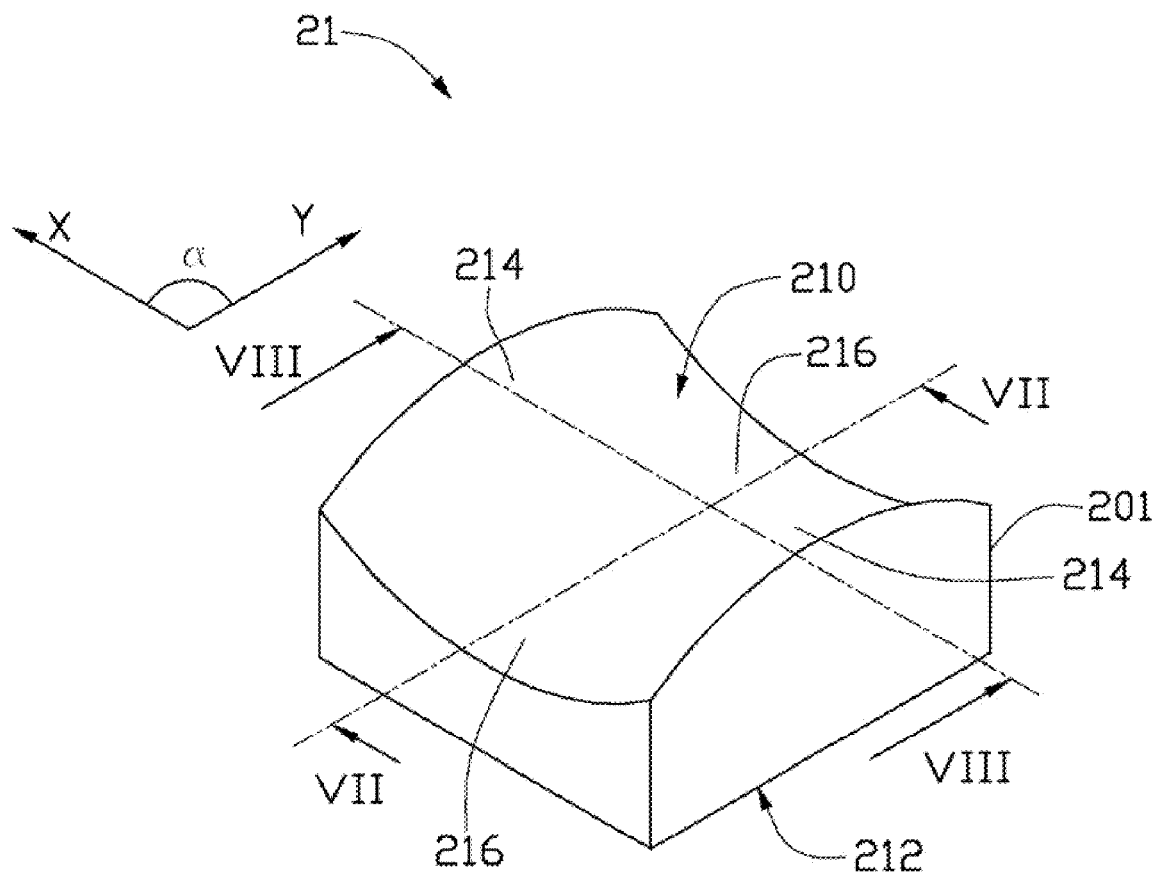
FIG. 6 is an isometric view of a lens unit of the optical lens of FIG. 5.
Figure 7:
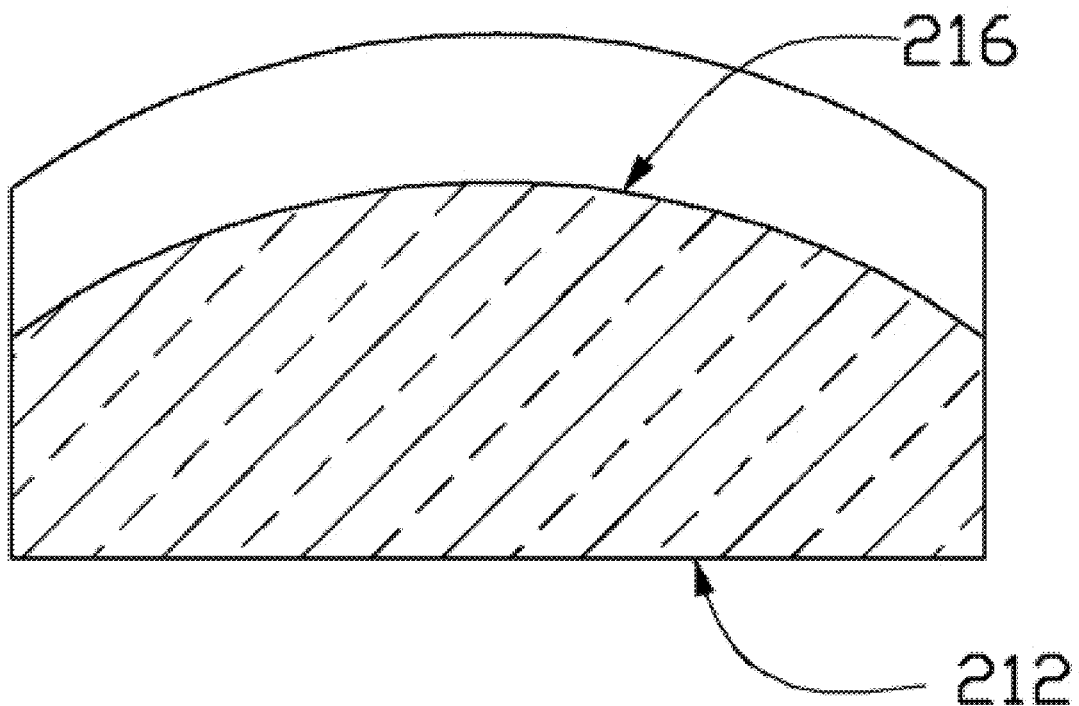
FIG. 7 is a cross-sectional view of the lens unit of FIG. 6, taken along line VII-VII thereof.
Figure 8:
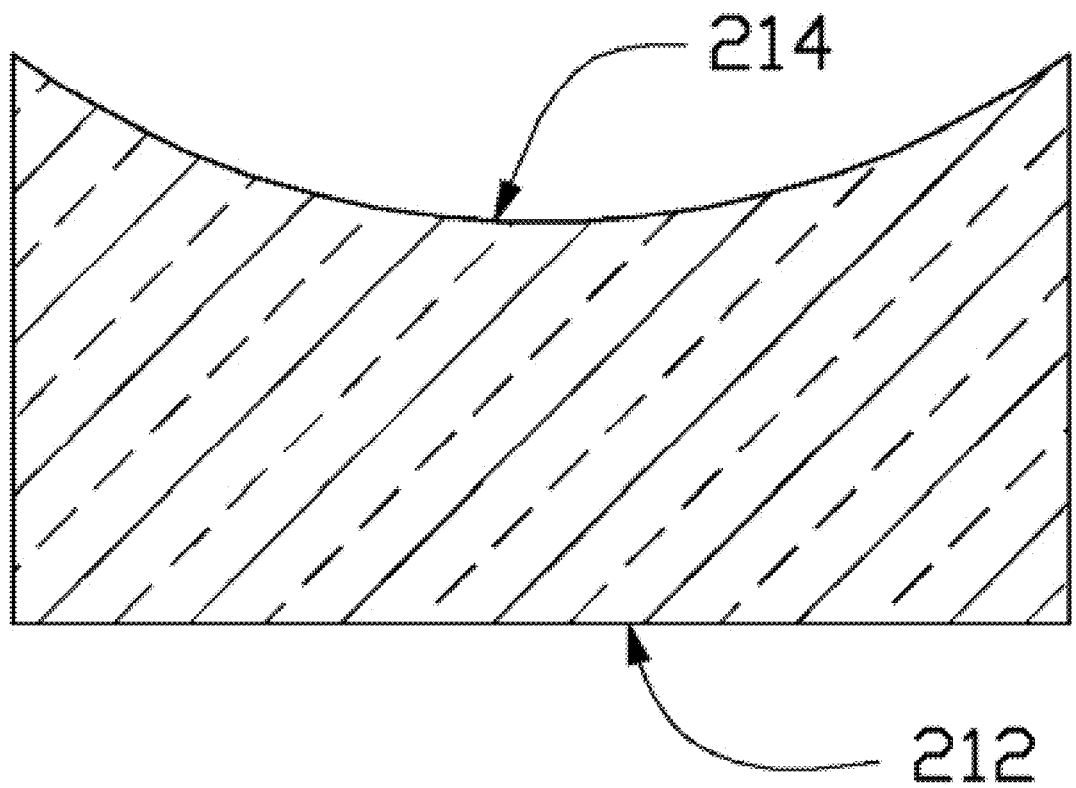
FIG. 8 is a cross-sectional view of the lens unit of FIG. 6, taken along line VIII-VIII thereof.

Referring to FIG. 4, the light field generated by the illuminating device 1 is shown. An illuminating length of the light field along the x-direction is greater than that of the light field along the y-direction. An illuminating intensity of the light field along the x-direction is greater than that of the light field along the y-direction. Accordingly, the illuminating device 1 can be applied in an application that requires a strip-type light field, such as in a street lamp, so as to improve the utilization rate of the light emitted from the LEDs 84.

A curvature of the light diverging portion 114 can be changed, so as to obtain a desired illuminating length and intensity of the light field along the x-direction. A curvature of the light converging portion 116 can be changed to obtain a desired illuminating length and intensity of the light field along the y-direction. As a result, the illuminating device 1 can satisfy different requirements merely by changing the curvatures of the light diverging portion 114 and the light converging portion 116.

In addition, the configuration of the light diverging portion 114 is not limited to a portion of an inner side surface of a cylinder along the y-direction. If desired, the light diverging portion 114 can be other concave curved surfaces, such as a portion of a side surface of a cone, a portion of a spherical surface and so on. The configuration of the light converging portion 116 is not limited to a portion of an outer side surface of a cylinder along the x-direction. If desired, the light converging portion 116 can be other convex curved surfaces, such as a portion of a side surface of a cone, a portion of a spherical surface and so on.

Furthermore, the angle α defined between the x-direction and the y-direction can be an acute angle, such as 45 degrees, 60 degrees and so on.

Moreover, the light diverging portion 114 can be formed on the light emitting surface 112, and the light converging portion 116 can be formed on the light incident surface 110.

Referring to FIGS. 5 to 8, an optical lens 20 in accordance with a second embodiment of the disclosure is shown. The optical lens 20 is similar to the optical lens 10 in the first embodiment. In the present embodiment, the light emitting surface 212 is a planar surface. The light diverging portion 214 and the light converging portion 216 of the lens unit 21 both are formed on the light incident surface 210. Namely, the light incident surface 210 is a composite curved surface of the concave curved surface along the y-direction and the convex curved surface along the x-direction. A height of the light incident surface 210 at a center thereof is less than that of the light incident surface 210 at two sides thereof along the x-direction. A height of the light incident surface 210 at the center thereof is greater than that of the light incident surface 210 at the two sides thereof along the y-direction. The principle of the light compression along the x-direction and the light expansion along the y-direction in the present embodiment is substantially the same as that in the first embodiment.

Figure 9:
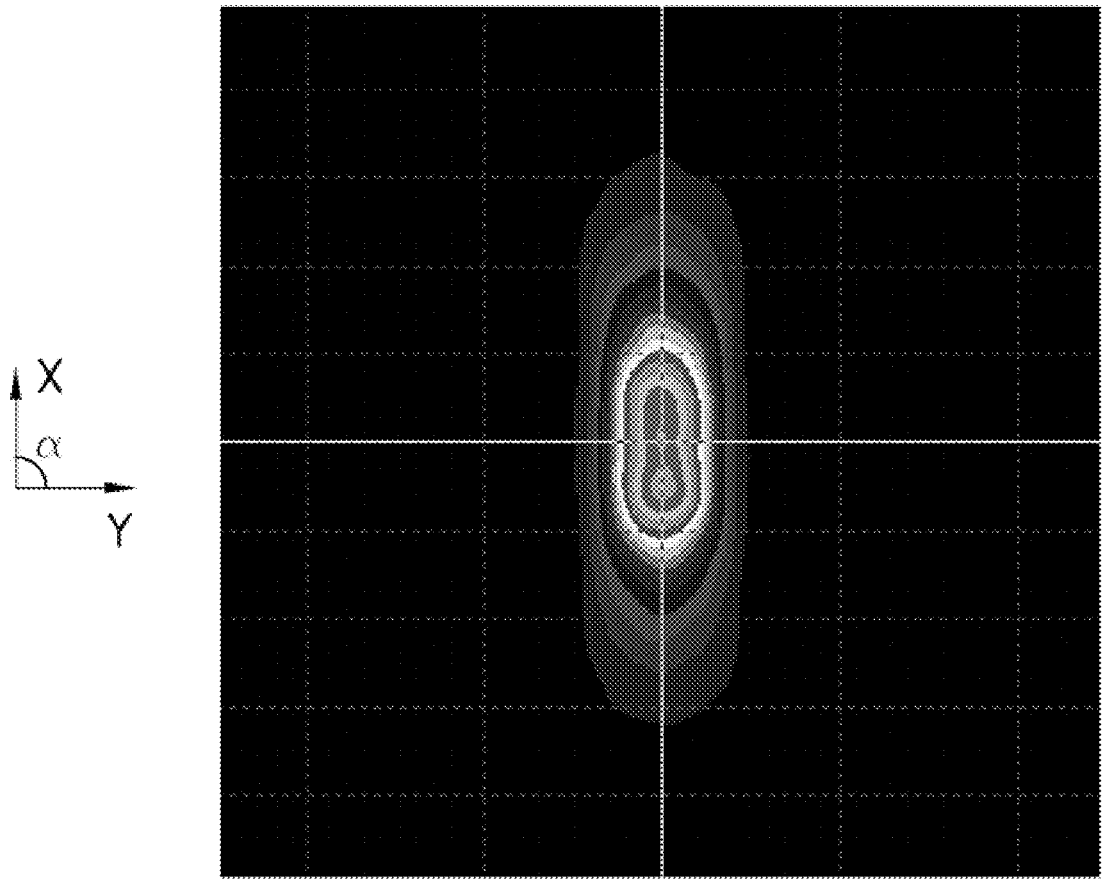
FIG. 9 is a graphic view showing a light field generated by the optical lens of FIG. 5.

Referring to FIG. 9, the light field generated by the optical lens 20 is shown. An illuminating length of the light field along the x-direction is greater than that of the light field along the y-direction. An illuminating intensity of the light field along the x-direction is greater than that of the light field along the y-direction. Accordingly, the optical lens 20 can be applied in an application that requires a strip-type light field.

Figure 10:
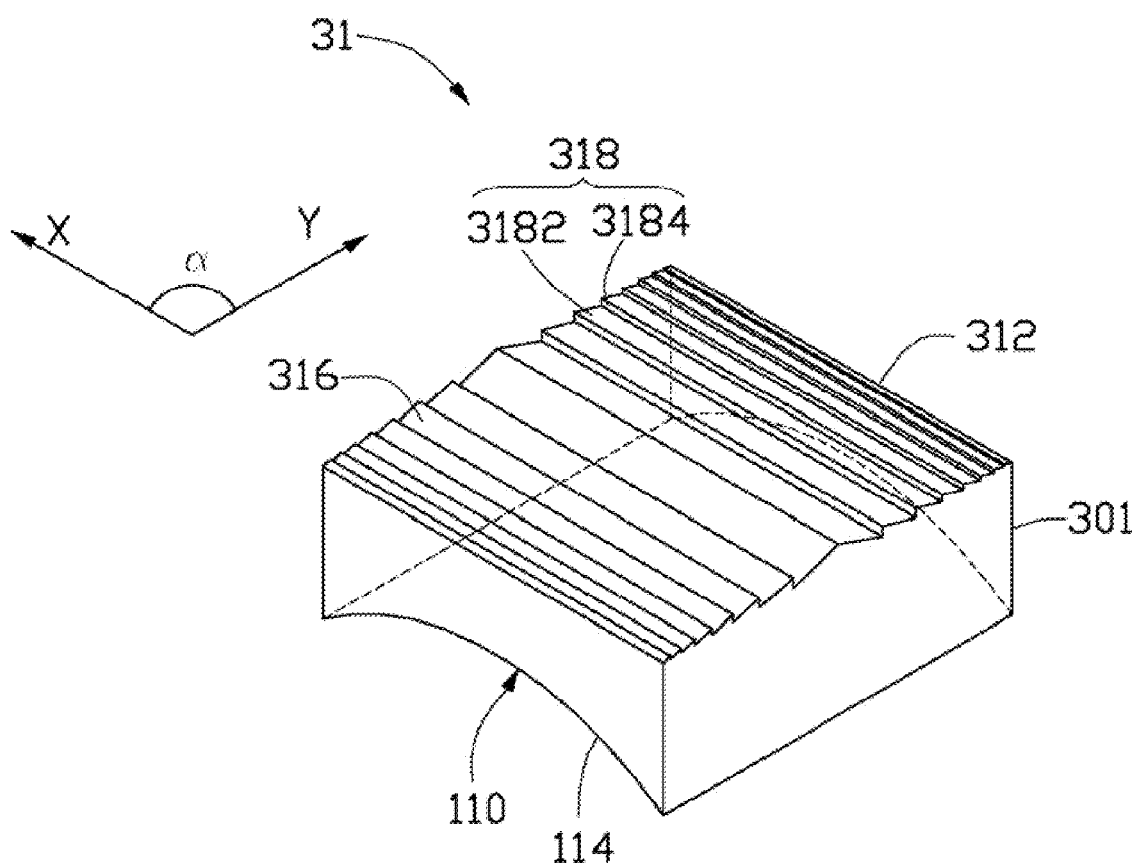
FIG. 10 is an isometric, schematic view of a lens unit, in accordance with a third embodiment of the disclosure.

Referring to FIG. 10, a lens unit 31 in accordance with a third embodiment of the disclosure is shown. The lens unit 31 is similar to the lens unit 11 in the first embodiment. In the present embodiment, the light converging portion 316 formed on the light emitting surface 312 of the main body 301 includes a plurality of recesses 318 defined in the light emitting surface 312 of the main body 301. The recesses 318 are parallel to each other along the x-direction, and symmetrically distributed on the light emitting surface 312 with respect to a central line of the light emitting surface 312. The recesses 318 have a width gradually decreased from a center towards two sides of the light emitting surface 312 along the y-direction.

Each recess 318 has a slanted top surface 3182 and a vertical side surface 3184 connected to a top surface 3182 of an adjacent recess 318. The two top surfaces 3182 of the two recesses 318 adjacent to the center of the light emitting surface 312 are connected with each other. The top surface 3182 is an inclined planar surface, which has a predetermined slope. A slope of the top surface 3182 gradually increases from the center towards the two sides of the light emitting surface 312 along the y-direction. Alternatively, the top surface 3182 of each recess 318 can be a curved surface, which has a predetermined curvature.

In the lens unit 31, the recesses 318 of the light converging portion 316 are parallel to each other and distributed on the light emitting surface 312, and the top surface 3182 of each recess 318 is an inclined planar surface or a curved surface, whereby the light converging portion 316 enables the light passing therethrough to deflect towards the center of the light emitting surface 312 along the y-direction. As a result, the light field along the y-direction generated by the LEDs 84 is compressed after the light passes through the light converging portion 316.

Figure 11:
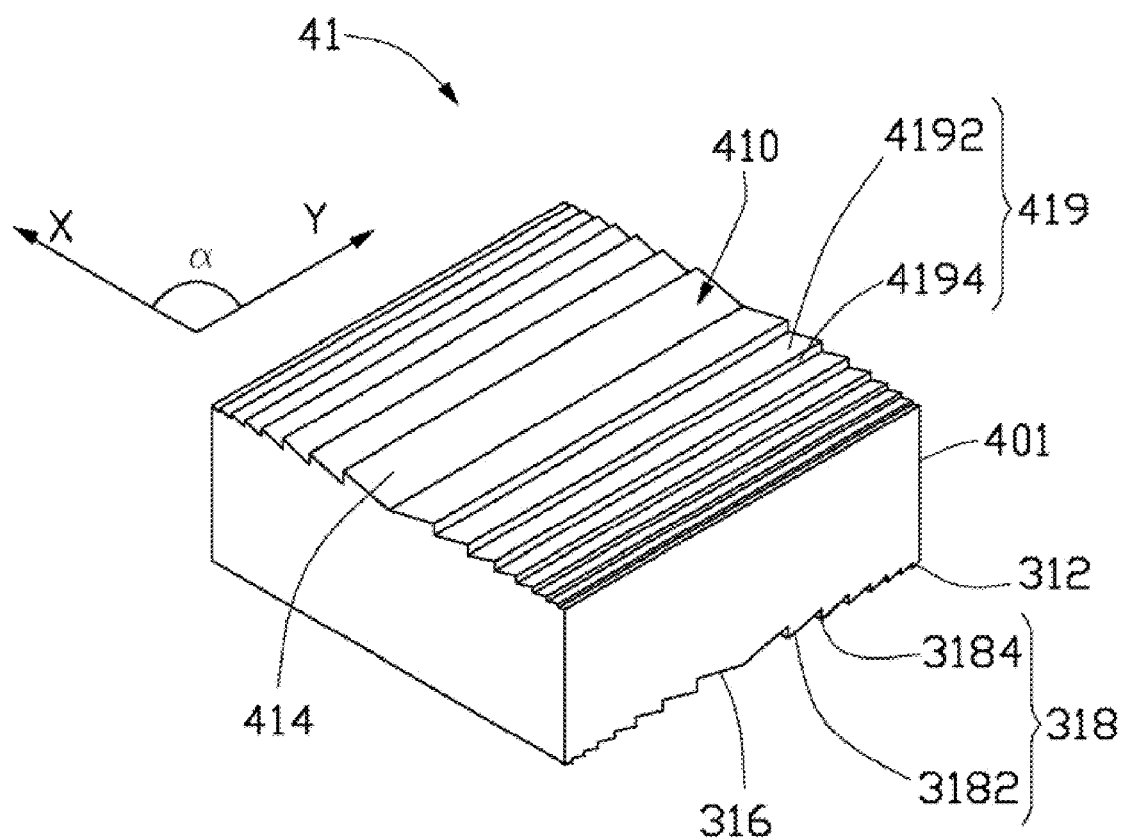
FIG. 11 is an isometric, schematic view of a lens unit, in accordance with a fourth embodiment of the disclosure.

Referring to FIG. 11, a lens unit 41 in accordance with a forth embodiment of the disclosure is shown. The lens unit 41 is similar to the lens unit 31 in the third embodiment except that a light diverging portion 414 is provided on the light incident surface 410. In the present embodiment, the light diverging portion 414 formed on the light incident surface 410 of the main body 401 includes a plurality of protrusions 419 protruding outwardly and upwardly from the light incident surface 410 of the main body 401. The protrusions 419 are parallel to each other along the y-direction, and are symmetrically distributed on the light incident surface 410 with respect to a central line of the light incident surface 410. The protrusions 419 have a width gradually decreasing from a center towards two sides of the light incident surface 410 along the x-direction.

Each protrusion 419 has a slanted bottom surface 4192 and a vertical side surface 4194 connected to the bottom surfaces 4192 of an adjacent protrusion 419. The two bottom surfaces 4192 of the two protrusions 419 adjacent to the center of the light incident surface 410 are connected with each other. The bottom surface 4192 is an inclined planar surface, which has a predetermined slope. A slope of the bottom surface 4192 gradually increases from the center towards the two sides of the light incident surface 410 along the x-direction. Alternatively, the bottom surface 4192 of each protrusion 419 can be a curved surface, which has a predetermined curvature.

In the lens unit 41, the protrusions 419 of the light diverging portion 414 are parallel to each other and distributed on the light incident surface 410 along the y-direction, and the bottom surface 4192 of each protrusion 419 is an inclined planar surface or a curved surface, whereby the light diverging portion 414 enables the light passing therethrough to radially deflect along the x-direction. As a result, the light field along the x-direction generated by the LEDs 84 is expanded after the light passes through the light diverging portion 414.

Figure 12:
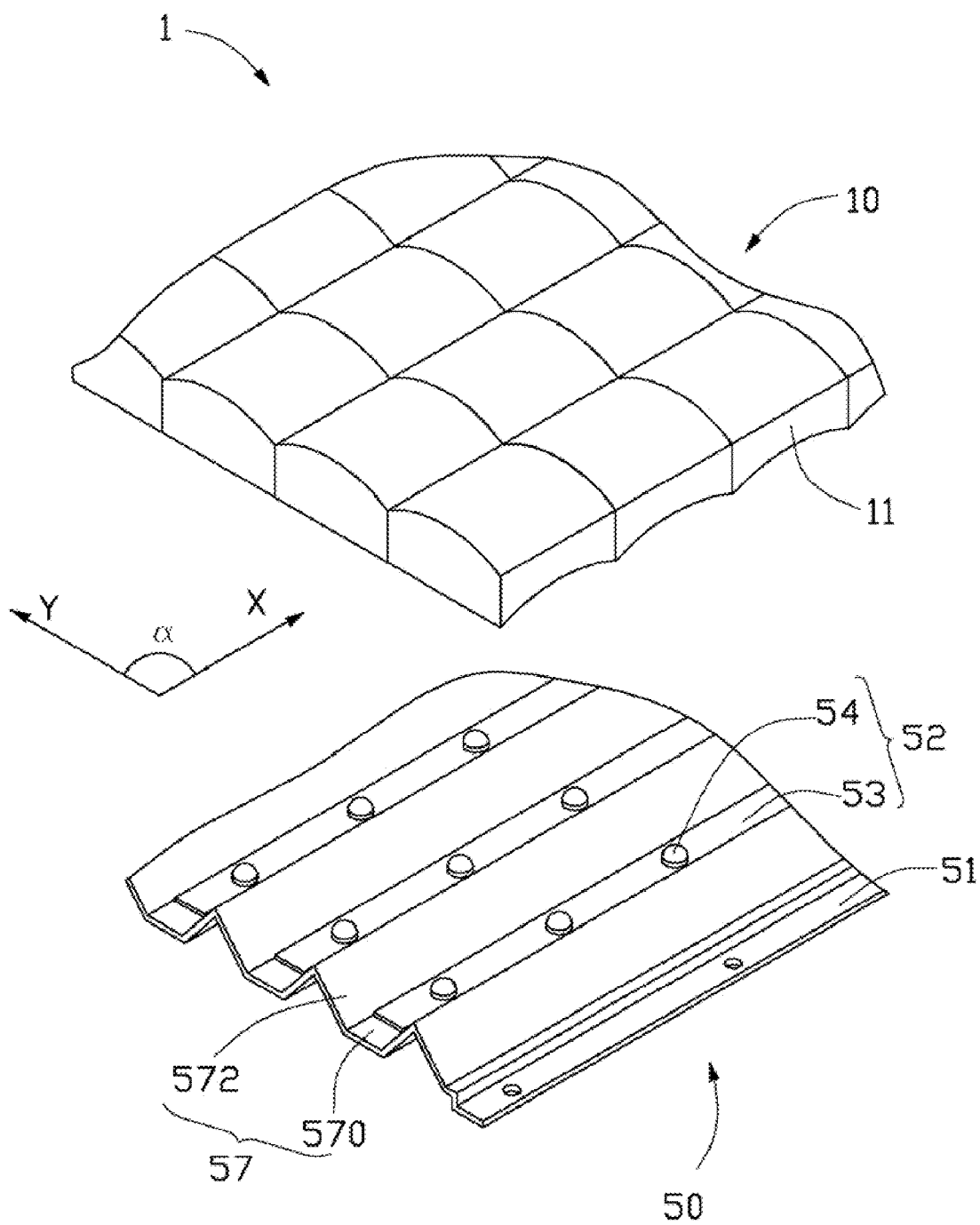
FIG. 12 is an isometric, schematic view of an illuminating device, in accordance with a fifth embodiment of the disclosure.

Referring to FIG. 12, an illuminating device 5 in accordance with a fifth embodiment of the disclosure is shown. The illuminating device 5 is similar to the illuminating device 1 in the first embodiment. In the present embodiment, the light source module 50 includes a reflecting unit 51 and a plurality of optical module 52 mounted on the reflecting unit 51.

The optical module 52 includes a strip-shaped circuit board 53 and a plurality of LEDs 54 mounted on the circuit board 53. The LEDs 54 have one-to-one corresponding relationships with respect to the lens units 11 of the optical lens 10. The reflecting unit 51 includes a plurality of parallel and strip-shaped grooves 57 along the x-direction. Each groove 57 has an inverted trapeziform transverse section. Each groove 57 is cooperatively enclosed by a bottom wall 570 and two sidewalls 572 (only one sidewall is labeled). The two sidewalls 572 are disposed opposite to each other. Each sidewall has a reflecting capability. Each optical module 52 is received in one corresponding groove 57, with the circuit board 53 of the optical module 52 abutting against the bottom wall 570 of the corresponding groove 57.

The light emitted from the LEDs 54 is reflected by the sidewalls 572 of the grooves 57 to deflect towards a center of the light source module 50 along the y-direction, and then towards the optical lens 10. As a result, the light field along the y-direction generated by the LEDs 54 is further compressed after the light passes through the optical lens 10.

Figure 13:
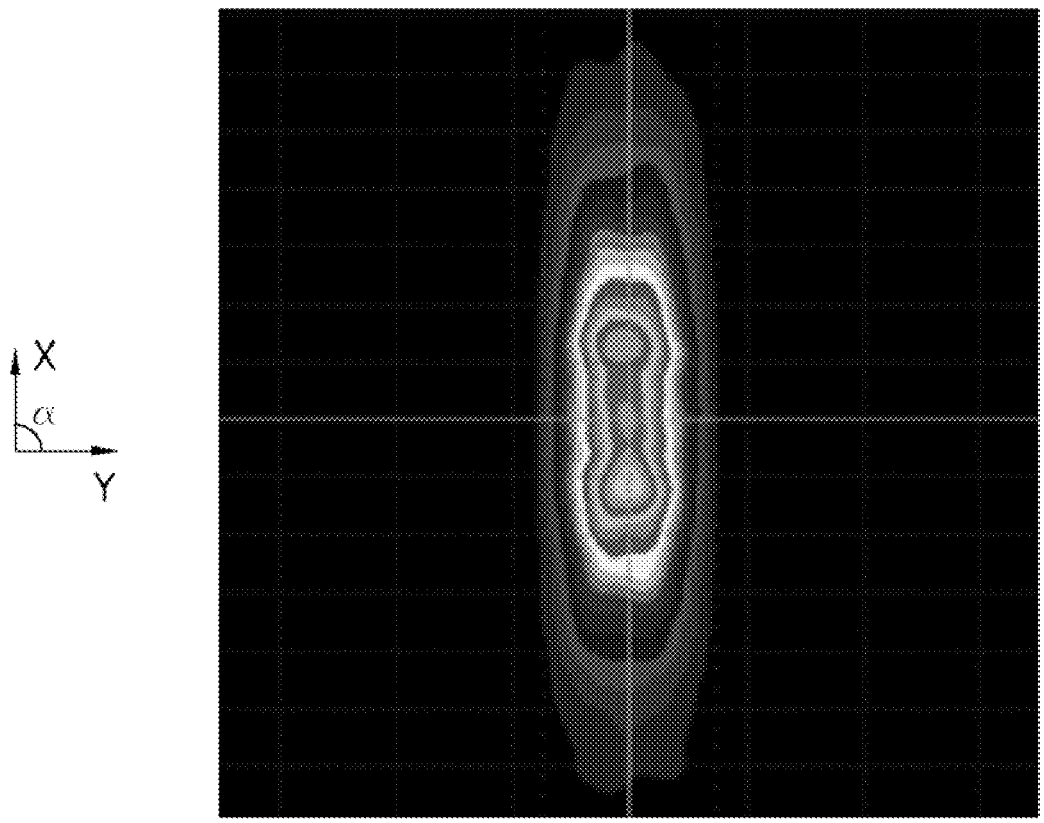
FIG. 13 is a graphic view showing a light field generated by the illuminating device of FIG. 12.
Figure 14:
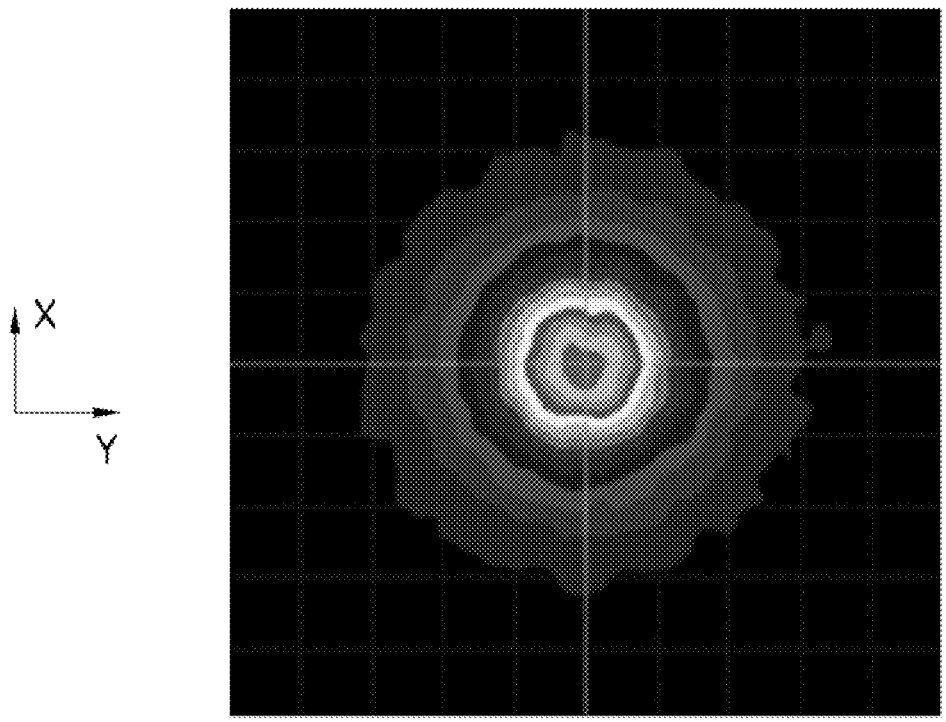
FIG. 14 is a graphic view showing a diffusion-typed light field in accordance with a related art.

Referring to FIG. 13, the light field generated by the illuminating device 5 is shown. An illuminating length of the light field along the y-direction is further compressed compared with the light field shown in FIG. 4. In addition, a glare phenomenon is further eliminated.

It is believed that the disclosure and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical lens adapted for use with light emitting diodes (LEDs) comprising:
   an array of lens units, the lens units having one-to-one corresponding relationships with respect to the LEDs and directly collecting light emitted from the LEDs, each lens unit comprising a main body, a light diverging portion and a light converging portion, the main body comprising a light incident surface and a light emitting surface opposite to the light incident surface, the light diverging portion being configured for expanding a light field along a first direction, the light converging portion being configured for compressing a light field along a second direction, the light diverging portion and the light converging portion being both formed on one of the light incident surface and the light emitting surface.

2. The optical lens as claimed in claim 1, wherein the light diverging portion is a concave curved surface, and the light converging portion is a convex curved surface, the one of the light incident surface and the light emitting surface being a composite curved surface of the convex curved surface along the first direction and the concave curved surface along the second direction.

3. The optical lens as claimed in claim 2, wherein a height of the one of the light incident surface and the light emitting surface at a center thereof is less than that of the one of the light incident surface and the light emitting surface at two sides thereof along the first direction.

4. The optical lens as claimed in claim 2, wherein a height of the one of the light incident surface and the light emitting surface at a center thereof is greater than that of the one of the light incident surface and the light emitting surface at two sides thereof along the second direction.

5. The optical lens as claimed in claim 2, wherein the other one of the light incident surface and the light emitting surface is a planar surface.

6. The optical lens as claimed in claim 1, wherein a predetermined angle is defined between the second direction and the first direction.

7. The optical lens as claimed in claim 6, wherein the first direction is perpendicular to the second direction.

8. An illuminating device comprising:
   a light source module for emitting light, the light source module comprising a plurality of light emitting diodes (LEDs); and
   an optical lens configured for adjusting the light emitted from the light source module, the optical lens comprising an array of lens units, the LEDs having one-to-one corresponding relationships with respect to the lens units, light emitted from each LED directly entering into a corresponding lens unit, each lens unit comprising a main body, a light diverging portion and a light converging portion, the main body comprising a light incident surface and a light emitting surface opposite to the light incident surface, the light diverging portion being configured for expanding a light field along a first direction, the light converging portion being configured for compressing a light field along a second direction, the light diverging portion and the light converging portion being both formed on one of the light incident surface and the light emitting surface.

9. The illuminating device as claimed in claim 8, wherein the light diverging portion is a concave curved surface, and the light converging portion is a convex curved surface, the one of the light incident surface and the light emitting surface being a composite curved surface of the convex curved surface along the first direction and the concave curved surface along the second direction.

10. The illuminating device as claimed in claim 9, wherein a height of the one of the light incident surface and the light emitting surface at a center thereof is less than that of the one of the light incident surface and the light emitting surface at two sides thereof along the first direction.

11. The illuminating device as claimed in claim 9, wherein a height of the one of the light incident surface and the light emitting surface at a center thereof is greater than that of the one of the light incident surface and the light emitting surface at two sides thereof along the second direction.

12. The illuminating device as claimed in claim 9, wherein the other one of the light incident surface and the light emitting surface is a planar surface.

13. The illuminating device as claimed in claim 8, wherein a predetermined angle is defined between the second direction and the first direction.

14. The illuminating device as claimed in claim 13, wherein the first direction is perpendicular to the second direction.

15. The illuminating device as claimed in claim 8, wherein the light source module comprises a circuit board, the LEDs being mounted on the circuit board.

* * * * *